US012597286B2

(12) United States Patent
Hashimoto

(10) Patent No.: US 12,597,286 B2
(45) Date of Patent: Apr. 7, 2026

(54) ELECTRONIC STRUCTURE

(71) Applicant: InnoLux Corporation, Miao-Li County (TW)

(72) Inventor: Kazuyuki Hashimoto, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 19/061,072

(22) Filed: Feb. 24, 2025

(65) Prior Publication Data

US 2025/0191402 A1     Jun. 12, 2025

Related U.S. Application Data

(63) Continuation of application No. 18/418,413, filed on Jan. 22, 2024, now Pat. No. 12,260,670, which is a continuation of application No. 18/151,002, filed on Jan. 6, 2023, now Pat. No. 11,915,509, which is a continuation of application No. 17/228,883, filed on Apr. 13, 2021, now Pat. No. 11,568,670.

(51) Int. Cl.
*G06V 40/13*     (2022.01)
*G06F 3/044*     (2006.01)

(52) U.S. Cl.
CPC .......... *G06V 40/1306* (2022.01); *G06F 3/044* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2017/0091508 A1* | 3/2017 | Han | ...................... | G06F 3/0446 |
| 2018/0224984 A1* | 8/2018 | Kim | ...................... | G06F 3/0443 |
| 2018/0321793 A1* | 11/2018 | Kim | ...................... | G06F 3/0446 |

* cited by examiner

*Primary Examiner* — Nicholas J Lee
(74) *Attorney, Agent, or Firm* — McClure, Qualey & Rodack, LLP

(57) ABSTRACT

An electronic structure includes a first electrode, a first insulating layer, a second electrode, a third electrode, and a conductive layer. The first electrode has an opening. The first insulating layer is disposed on the first electrode. The second electrode is disposed on the first insulating layer. The third electrode is disposed on the first insulating layer and surrounding the second electrode. The conductive layer disposed under the first electrode. The second electrode and the third electrode are in the same layer. An area of the conductive layer is greater than an area of the second electrode.

10 Claims, 6 Drawing Sheets

ELECTRONIC STRUCTURE

CROSS REFERENCE TO RELATED APPLICATIONS

This application is a Continuation of U.S. patent application Ser. No. 18/418,413, filed on Jan. 22, 2024, which is a continuation of U.S. patent application Ser. No. 18/151, 002, filed on Jan. 6, 2023, which claims priority to U.S. patent application Ser. No. 17/228,883, filed on Apr. 13, 2021, now U.S. Pat. No. 11,568,670, entitled "CAPACITIVE SENSOR", the entirety of which is incorporated by reference herein.

FIELD OF THE DISCLOSURE

The disclosure is related to an electronic device, and in particular it is related to a capacitive sensor using stray-capacitive sensing.

DESCRIPTION OF THE RELATED ART

The two major capacitive sensing methods are self-capacitive sensing and mutual-capacitive sensing. Self-capacitive sensing may be a good solution for fingerprint sensing because a large capacitance (signal) changed will be expected due to vertical electrical field, but it needs capacitance to voltage conversion for sensing. On the other hand, mutual-capacitive sensing has a voltage output which will be simplified for circuit design, but large capacitance (signal) changed will not be expected due to lateral electrical field for fingerprint sensing.

In addition, self-capacitive sensing has capacitance to voltage converter in a pixel, which is obstacle for high dots per inch (dpi). Another method is charge transfer from the capacitance to fingerprint (ridge or valley) to a converter outside of active area through sensing lines. Capacitive loading of sensing lines make scan speed slower and noise immunity worse.

BRIEF SUMMARY OF THE DISCLOSURE

In order to resolve the issue described above, the present disclose provides an electronic device applicable to sense a fingerprint. The capacitive sensor includes a first electrode and at least one second electrode. The first electrode includes at least one opening. The at least one second electrode is disposed on the first electrode. The at least one second electrode covers the at least one opening of the first electrode. The at least one conductive layer disposed under the first electrode.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
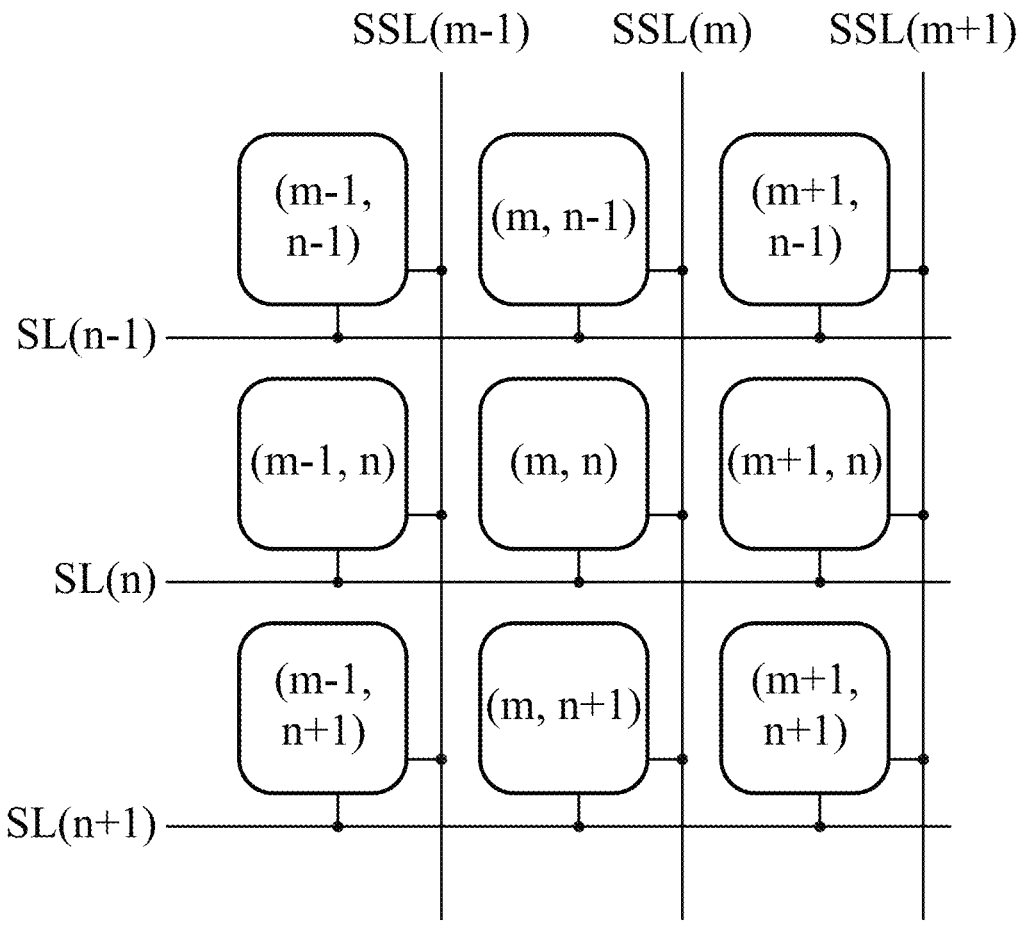
FIG. 1 is a schematic diagram of a sensor pixel array with scan lines in row and sensing lines in column in accordance with some embodiments of the disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented.

The electrical connection or coupling described in this disclosure may refer to direct connection or indirect connection. In the case of direct connection, the endpoints of the components on the two circuits are directly connected or connected to each other by a conductor line segment, while in the case of indirectly connected, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components, they are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

FIG. 1 is a schematic diagram of a sensor pixel array with scan lines in row and sensing lines in column in accordance with some embodiments of the disclosure. As shown in FIG. 1, the sensor pixel array in FIG. 1 includes nine capacitive sensors, such as a capacitive sensor (m−1, n−1), a capacitive sensor (m−1, n), a capacitive sensor (m−1, n+1), a capacitive sensor (m, n−1), a capacitive sensor (m, n), a capacitive sensor (m, n+1), a capacitive sensor (m+1, n−1), a capacitive sensor (m+1, n), and a capacitive sensor (m+1, n+1), but the present disclosure is not limited thereto. The capacitive sensors may be fingerprint sensors for sensing a fingerprint, but is not limited thereto. The following may take the fingerprint sensors as an example.

Each of the nine capacitive sensors is electrically connected to one of sensing lines and one of scan lines respectively. For example, the capacitive sensor (m−1, n−1) is electrically connected to a sensing line SSL(m−1) and a scan line SL(n−1). The capacitive sensor (m−1, n) is electrically connected to the sensing line SSL(m−1) and a scan line SL(n). The capacitive sensor (m−1, n+1) is electrically connected to the sensing line SSL(m−1) and a scan line SL(n+1). The capacitive sensor (m, n−1) is electrically connected to a sensing line SSL(m) and the scan line SL(n−1). The capacitive sensor (m, n) is electrically connected to the sensing line SSL(m) and the scan line SL(n). The capacitive sensor (m, n+1) is electrically connected to the sensing line SSL(m) and the scan line SL(n+1). The capacitive sensor (m+1, n−1) is electrically connected to a sensing line SSL(m+1) and the scan line SL(n−1). The capacitive sensor (m+1, n) is electrically connected to the sensing line SSL(m+1) and the scan line SL(n). The capacitive sensor (m+1, n+1) is electrically connected to the SSL sensing line (m+1) and the scan line SL(n+1).

When a finger of a user touches the sensor pixel array, for example, a portion of the finger of the user is placed above the capacitive sensor (m, n) in a sensing period, and the voltage on the scan line SL(n) may be pulled high at the sensing period, the capacitance variance between a ridge of the fingerprint and the capacitive sensor (m, n), or a valley of the fingerprint and the capacitive sensor (m, n) can be converted into voltage variance by the capacitive sensor (m, n).

In the present disclosure, the sensor pixel array in FIG. 1 is applied in an electronic device. The electronic device can be any suitable type device, such as a touch display device, an antenna device, a tiled device, a sensing device, a flexible device, etc., but is not limited thereto. The electronic device described in the present disclosure is a touch display device with touch and display functions, and the display device may include liquid crystal (LC), light-emitting diode (LED), quantum dots (QDs), fluorescence, phosphor, other suitable materials or a combination of the above materials, but is not limited thereto. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The tiled device may be, for example, a tiled display device or a tiled antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

Figure 2:
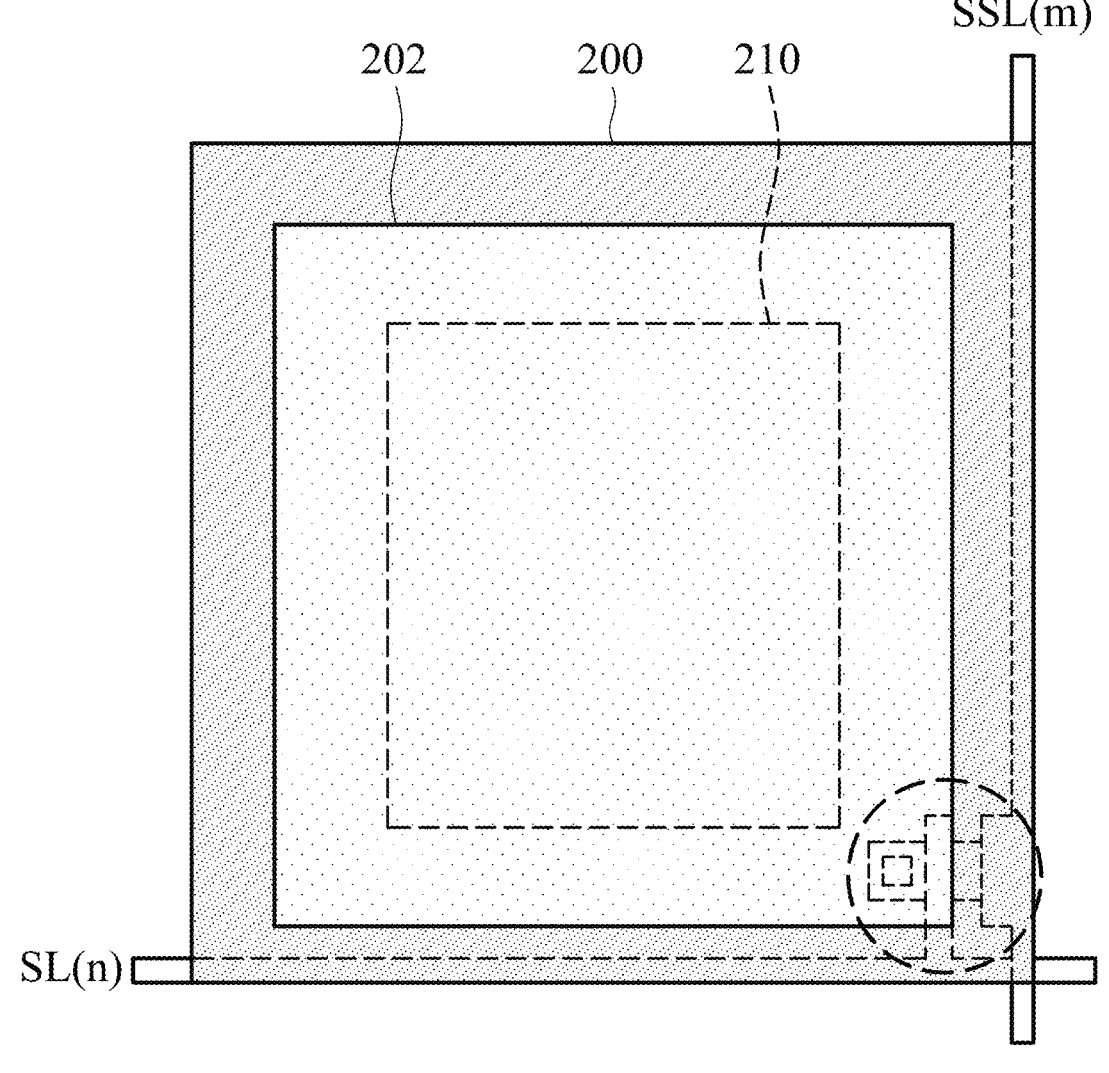
FIG. 2 is a top view of one capacitive sensor in the sensor pixel array in FIG. 1 in accordance with some embodiments of the disclosure.

FIG. 2 is a top view of one capacitive sensor in the sensor pixel array in FIG. 1 in accordance with some embodiments of the disclosure. Taking the capacitive sensor (m, n) as an example, the capacitive sensor (m, n) includes an electrode 200 and an electrode 202. The electrode 202 is disposed on the electrode 200. The electrode 200 includes an opening 210, which is present at the center of the electrode 200, but is not limited thereto. As shown in FIG. 2, the electrode 202 covers the opening 210 of the electrode 200 from the top view. In other words, the size of the electrode 202 is larger than that of the opening 210 of the electrode 200.

In some embodiments, the electrode 202 is electrically connected to the sensing line SSL(m) and the scan line SL(n) through at least one switch, such as a transistor (for example a thin-film transistor, TFT), which is disposed in a dotted circle marked in FIG. 2. In some embodiments, the at least one switch is in a circuit layer (not shown) disposed under the electrode 200. The present disclosure uses the "transistor" as a driving switch, as an example for description.

Figure 3A:
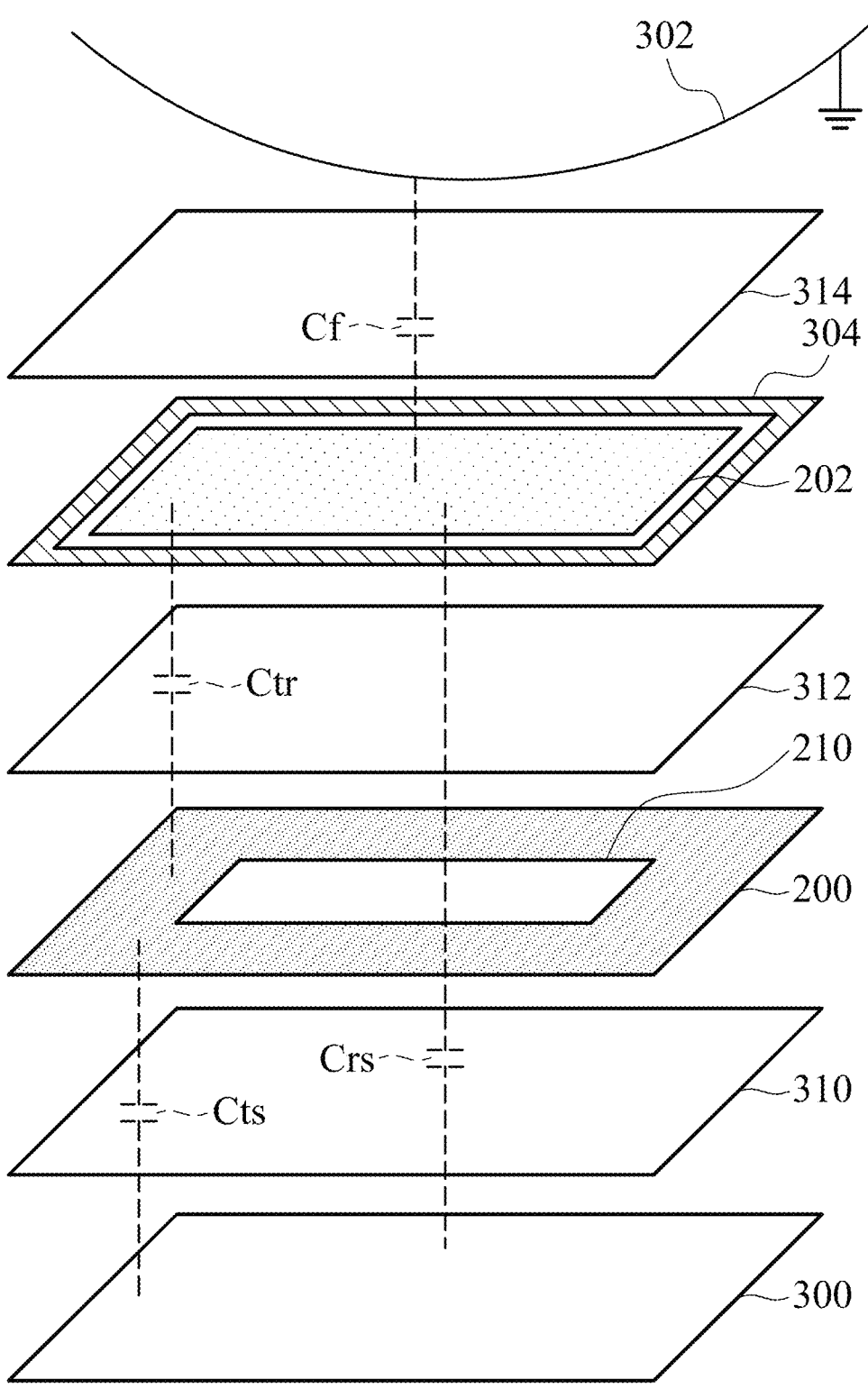
FIG. 3A is a schematic diagram of the capacitive senor in FIG. 2 interacting with a fingerprint in accordance with some embodiments of the disclosure.

FIG. 3A is a schematic diagram of the fingerprint senor in FIG. 2 interacting with a fingerprint in accordance with some embodiments of the disclosure. As shown in FIG. 3A, the capacitive senor (m, n) further includes a conductive layer 300, which is disposed under the electrode 200. In other words, the electrode 200 is disposed between the electrode 202 and the conductive layer 300. In some embodiments, the electrode 200 and the electrode 202 may be transparent, for example, which comprise indium tin oxide (ITO), indium zinc oxide (IZO), other suitable materials or combinations of the foregoing materials, but the present disclosure is not limited thereto. The conductive layer 300 may comprise metal, ITO, other suitable materials, or combinations of the foregoing materials based on the application of the capacitive senor (m, n), but the present disclosure is not limited thereto. For example, if the capacitive senor (m, n) is applied on a display with backlights, the conductive layer 300 may be transparent. If the capacitive senor (m, n) is applied on a keyboard for fingerprint detecting, the conductive layer 300 may comprise metal or other materials. In some embodiments, a voltage Vr, which may be a direct current (DC) voltage, such as a ground voltage, is provided on the conductive layer 300.

The capacitive senor (m, n) may further include an insulating layer 310, an insulating layer 312, and an insulating layer 314. As shown in FIG. 3A, the insulating layer 310 may be disposed between the electrode 200 and the conductive layer 300. In detail, the insulating layer 310 may be disposed between the above-mentioned circuit layer and the electrode 200 or the insulating layer 310 may be one layer in the above-mentioned circuit layer. The insulating layer 312 may be disposed between the electrode 200 and the electrode 202. The insulating layer 314 may be disposed between the electrode 202 and the fingerprint 302. The material of the insulating layer 310, the insulating layer 312, and the insulating layer 314 may include such as silicon oxide (SiO$_x$), silicon nitride (SiN$_y$), silicon oxynitride (SiO$_x$N$_y$), polymethylmetacrylate (PMMA), other suitable insulating material or a combination thereof, but the present disclosure is not limited thereto. In some embodiments, the material of the insulating layer 310, the insulating layer 312, and the insulating layer 314 may be the same, or may be different from each other, but the present disclosure is not limited thereto. In some embodiments, the thickness of the insulating layer 310, the insulating layer 312, and the insulating layer 314 may be, for example 2500A, but the present disclosure is not limited thereto. In some embodiments, the thickness of the insulating layer 310, the insulating layer 312, and the insulating layer 314 may be different from each other. For example, the insulating layer 310 is thicker than the insulating layer 312, and the insulating layer 312 is thicker than the insulating layer 314. In some embodiment, the insulating layer 314 is thicker than the insulating layer 312, and the insulating layer 312 is thicker than the insulating layer 310. In some embodiment, the insulating layer 312 is thicker than the insulating layer 310, and the insulating layer 312 is thicker than the insulating layer 314, but the present disclosure is not limited thereto.

In some embodiments, the capacitive senor (m, n) further includes a common electrode 304. The common electrode 304 may surround the electrode 202, and the voltage Vr may be also provided on the common electrode 304 for shielding an electrical field generated from the other nearby components, for example the capacitive sensor (m, n–1), the capacitive sensor (m–1, n), the capacitive sensor (m, n+1), or the capacitive sensor (m+1, n) in FIG. 1, to lower the interference from the nearby capacitive sensors.

As shown in FIG. 3A, a capacitor Cts is formed between the conductive layer 300 and the electrode 200. A capacitor Crs is formed between the conductive layer 300 and the electrode 202. A capacitor Ctr is formed between the electrode 200 and the electrode 202. A capacitor Cf is formed between the electrode 202 and the fingerprint 302.

Figure 3B:
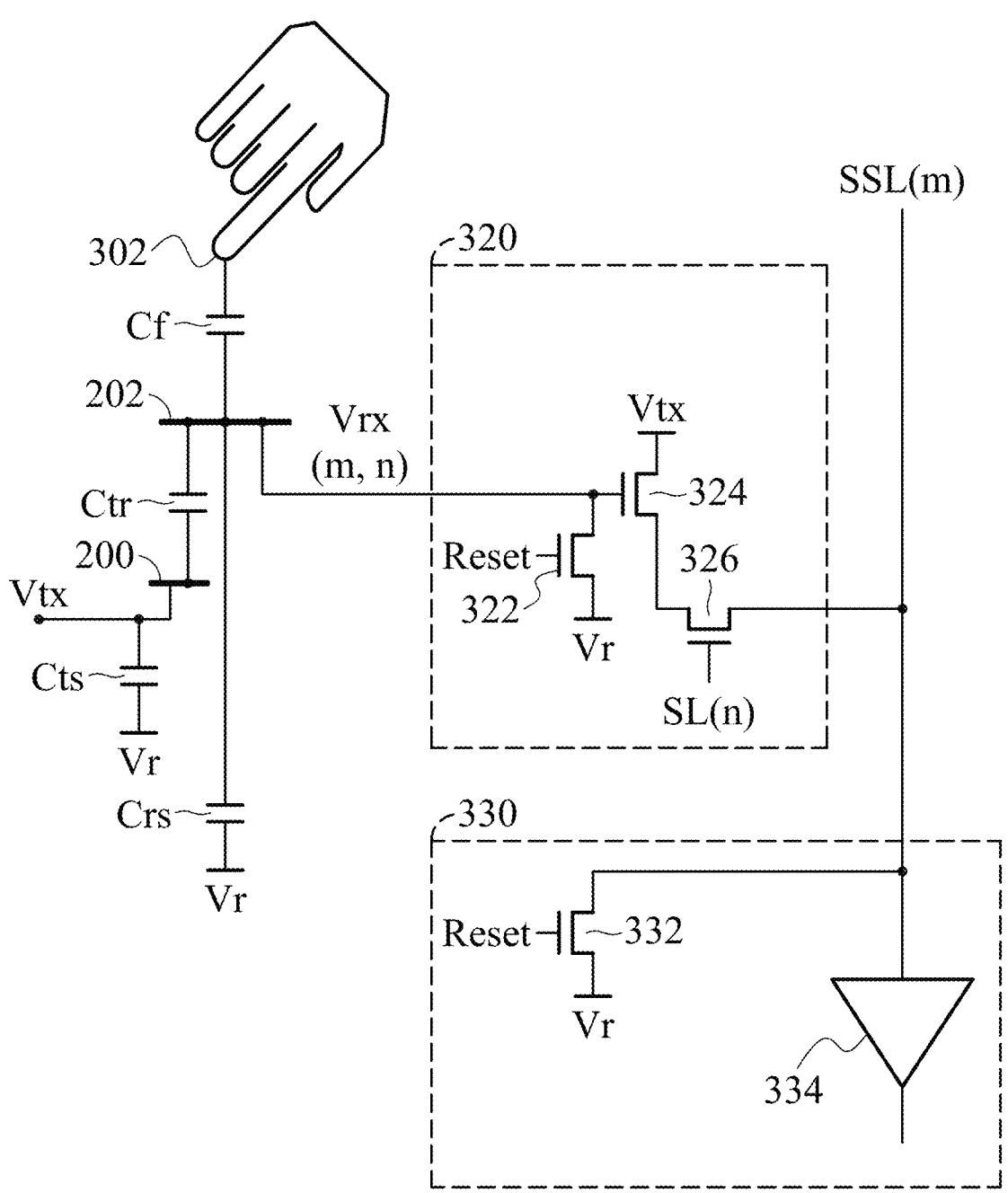
FIG. 3B is an equivalent circuit of the capacitive senor in FIG. 3A in accordance with some embodiments of the disclosure.

FIG. 3B is an equivalent circuit of the fingerprint senor in FIG. 3A in accordance with some embodiments of the disclosure. As shown in FIG. 3B, a sensing signal Vtx, which may be a clock signal, is provided on the electrode 200. The capacitor Cts is disposed between the voltage Vr (that is, the conductive layer 300) and the electrode 200. The capacitor Crs is disposed between the voltage Vr and the electrode 202. The capacitor Ctr is disposed between the electrode 200 and the electrode 202. The capacitor Cf is disposed between the electrode 202 and the fingerprint 302. In some embodiments, the electrode 200 can be seen as a transmitter (Tx) of the capacitive sensor (m, n), because the sensing signal Vtx is transmitted from the electrode 200. The electrode 202 can be seen as a receiver (Rx) of the capacitive sensor (m,n), because an output voltage Vrx(m, n) can be received from the electrode 202.

In some embodiments, the capacitor Cts may be 7.76 femto-Farad (fF), the capacitor Crs may be 13.47 fF, and the capacitor Ctr may be 150.52 fF, but they are not limited thereto. The capacitor Cf between the electrode 202 and the ridge of the fingerprint 302 may be 430.30 fF. However, the capacitor Cf between the electrode 202 and the valley of the fingerprint 302 may be 0.18 fF. Since the output voltage Vrx(m, n) is inversely proportional to the capacitance between the electrode 202 and the fingerprint 302, the output voltage Vrx(m, n) corresponding to the ridge of the fingerprint 302 is less than that corresponding to the valley of the fingerprint 302.

For example, when the sensing signal Vtx with amplitude of 15V is applied to the electrode 200, the output voltage Vrx(m, n) may be 3.8V corresponding to the ridge of the fingerprint 302 with depth of 0 μm (assuming that the ridge of the fingerprint 302 is directly contacted with the insulating layer 314), and the output voltage Vrx(m, n) may be 13.75V corresponding to the valley of the fingerprint 302 with depth of 100 μm (assuming that the depth of the valley of the fingerprint 302 is 100 μm).

As shown in FIG. 3B, the capacitive senor (m, n) may further include a control circuit 320. The sensing line SSL(m) may be electrically connected to the electrode 202 through the control circuit 320. In some embodiments, the control circuit 320 may include a transistor 322, a transistor 324, and a transistor 326, but the present disclosure is not limited thereto. The transistor 322 may have a first terminal received the voltage Vr, a second terminal electrically connected to the electrode 202, and a gate terminal received a reset signal Reset. The transistor 324 may have a first terminal received the sensing signal Vtx, a second terminal electrically connected to a first terminal of the transistor 326, and a gate terminal of the transistor 324 may be electrically connected to the electrode 202. The transistor 326 may have a second terminal electrically connected to the sensing line SSL(m), and a gate terminal of the transistor 326 may be electrically connected to the scan line SL(n).

The reset signal Reset defines non-sensing periods, and the sensing signal Vtx defines sensing periods. In other words, the reset signal Reset may be pulled high and the sensing signal Vtx may be pulled low during the non-sensing periods. The reset signal Reset may be pulled low and the sensing signal Vtx may be pulled high during the sensing periods. During the sensing periods, for example, when the sensing signal Vtx is pulled high, the voltage on the scan line SL(n) is also pulled high, the transistor 322 may be turned off and the transistor 326 may be turned on, the magnitude of the current passing through the transistor 324 and the transistor 326 can be determined according to the output voltage Vrx(m, n). In other words, the higher the output voltage Vrx(m, n) is, the larger magnitude of the current passing through the transistor 324 and the transistor 326 to the sensing line SSL(m). Therefore, a voltage corresponding to the ridge of the fingerprint 302 is present on the sensing line SSL(m) based on the current flowing through the transistor 324 and the transistor 326 during the sensing periods. Similarly, a voltage corresponding to the valley of the fingerprint 302 is also present on the sensing line SSL(m) based on the current flowing through the transistor 324 and the transistor 326 during the sensing periods. In some embodiments, the reset signal Reset defines reset periods. During a reset period, the reset signal Reset is pulled high and the sensing signal Vtx is pulled low, then output voltage Vrx(m, n) is initialized with the voltage Vr by the transistor 322.

In some embodiments, a voltage read-out circuit 330 receives the voltages corresponding to the ridge and/or the valley of the fingerprint 302 from the sensing line SSL(m), and converts the voltages into digital signals. The voltage read-out circuit 330, for example, may include a transistor 332 and an analog-to-digital converter (ADC) 334. The transistor 332 may have a first terminal electrically connected to the sensing line SSL(m), and a second terminal received the voltage Vr. A gate terminal of the transistor 332 receives the reset signal Reset, and an input of the ADC 334 is electrically connected to the sensing line SSL(m). During the sensing periods, when the reset signal Reset is pulled low, the transistor 332 is turned off, the voltages corresponding to the ridge and/or the valley of the fingerprint 302 from the sensing line SSL(m) is converted into digital signals by the ADC 334. In some embodiments, during the reset period, the reset signal Reset is pulled high, the transistor 332 is turned on, then the sensing line SSL(m) is initialized with the voltage Vr by the transistor 332.

In some embodiments, the capacitive sensor (m, n) may further include a current read-out circuit (not shown) for replacing the voltage read-out circuit 330. The current read-out circuit, for example, may include a transistor, an op amplifier, an ADC, and a capacitor. The first input port of the op amplifier may be electrically connected to the sensing line SSL(m), the second input port of the op amplifier may receive the voltage Vr, and the output of the op amplifier may be electrically connected to the input of the ADC. The capacitor may be electrically connected between the sensing line SSL(m) and the output of the op amplifier. The transistor may be electrically connected between the sensing line SSL(m) and the output of the op amplifier. During the sensing periods, when the transistor is turned off, the currents corresponding to the ridge and/or the valley of the fingerprint 302 from the sensing line SSL(m) is converted into voltages by the capacitor and the op amplifier. The voltages will be converted into digital signals by the ADC. In some embodiments, the voltage read-out circuit 330 and the current read-out circuit may be disposed outside the capacitive sensor (m, n), for example, they are disposed in other function chip. In some embodiments, during the reset period, the transistor is turned on, the capacitor is initialized, then the output of the op amplifier has the voltage Vr as an initial value.

In some embodiments, when the current read-out circuit is used to replace the voltage read-out circuit 330, a p-type transistor can be used as the transistor 324 in the control circuit 320. When the voltage read-out circuit 330 is used, a n-type transistor can be used as the transistor 324 in the control circuit 320.

Figure 4A:
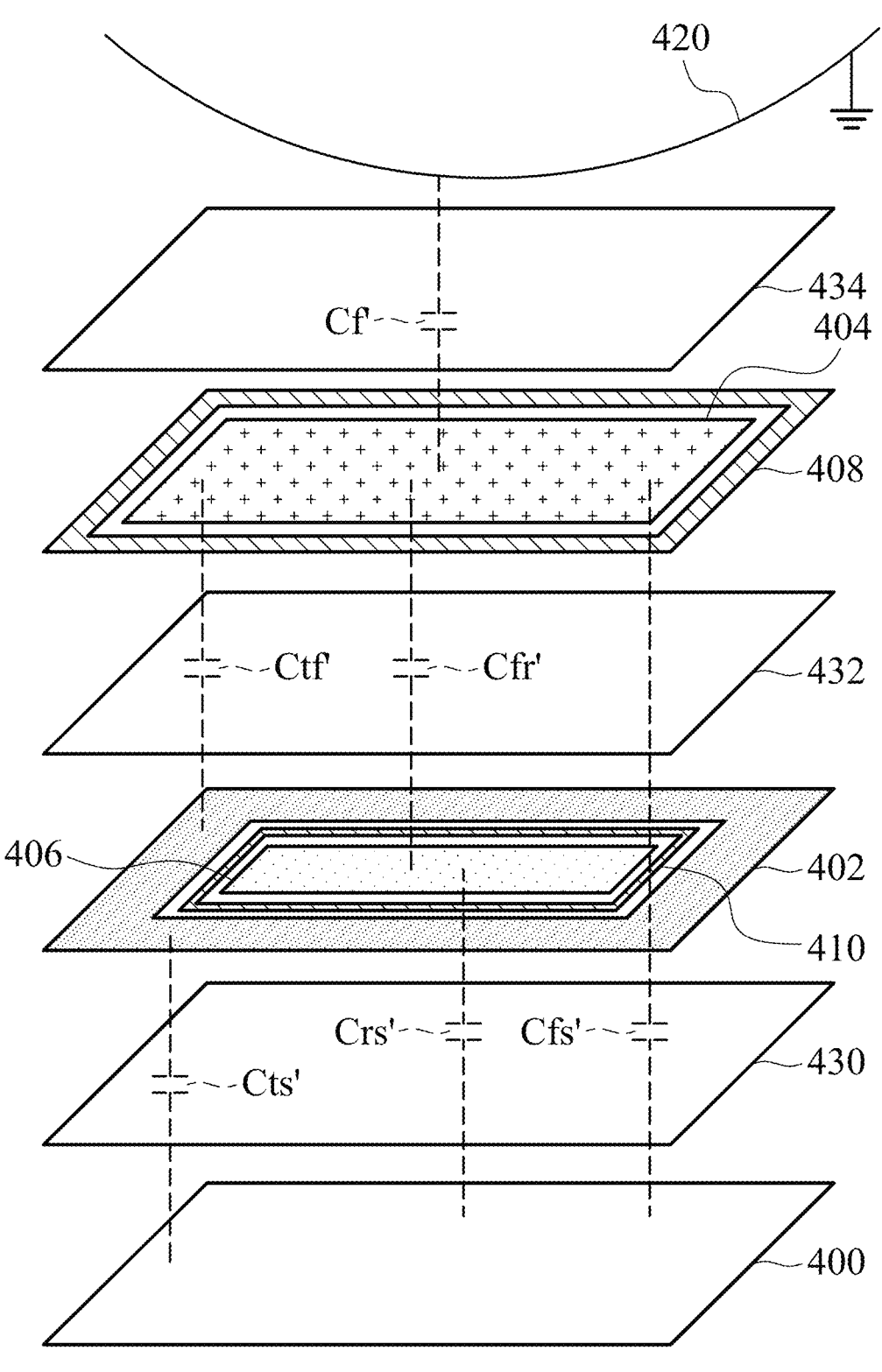
FIG. 4A is a schematic diagram of a capacitive sensor interacting with a fingerprint in accordance with some embodiments of the disclosure.

FIG. 4A is a schematic diagram of a capacitive sensor interacting with a fingerprint in accordance with some embodiments of the disclosure. As shown in FIG. 4A, the capacitive senor (m, n) includes a conductive layer 400, an electrode 402, an electrode 404, and an electrode 406. The electrode 404 is disposed on the electrode 402. The electrode 404 covers the opening of the electrode 402. In other words, the size of the electrode 404 is larger than that of the opening of the electrode 402. The electrode 406 is disposed in the opening of the electrode 402. In some embodiments, the electrode 406 is substantially coplanar with the electrode 402, but the present disclosure is not limited thereto.

The conductive layer 400 is disposed under the electrodes 402 and 406. In other words, the electrodes 402 and 406 are disposed between the conductive layer 400 and the electrode 404. The electrode 404 is disposed between the electrode 402 and a fingerprint 420. In some embodiments, a voltage Vr, which may be a direct current (DC) voltage, such as a ground voltage, is provided on the conductive layer 400. In some embodiments, the electrode 400 and the electrode 402 may be transparent, for example, which comprise ITO, indium zinc oxide (IZO), other suitable materials or combinations of the foregoing materials, but the present disclosure is not limited thereto. The conductive layer 400 may comprise metal, ITO, other suitable materials, or combinations of the foregoing materials based on the application of the capacitive senor (m, n), but the present disclosure is not limited thereto.

The capacitive senor (m, n) in FIG. 4A further includes an insulating layer 430, an insulating layer 432, and an insulating layer 434. The materials of the insulating layer 430, the insulating layer 432, and the insulating layer 434 may be the same as those of the insulating layer 310, the insulating layer 312, and the insulating layer 314, thus the present disclosure does not repeat them again. In some embodiments, the thickness of the insulating layer 430, the insulating layer 432, and the insulating layer 434 may be the same as that of the insulating layer 310, the insulating layer 312, and the insulating layer 314, thus the present disclosure does not repeat it again.

In some embodiments, the capacitive senor (m, n) in FIG. 4A further includes a common electrode 408 and/or a common electrode 410. The common electrode 408 may surround the electrode 404, and the electrode 410 may surround the electrode 406. The voltage Vr may be also provided on the common electrodes 408 for shielding to lower the interference from the nearby capacitive sensors, for example, the capacitive sensor (m, n−1), the capacitive sensor (m−1, n), the capacitive sensor (m, n+1), or the capacitive sensor (m+1, n) in FIG. 1. The voltage Vr may be also provided on the common electrodes 410 for shielding to lower the interference between the electrode 402 and the electrode 406.

As shown in FIG. 4A, a capacitor Cts' is formed between the conductive layer 400 and the electrode 402. A capacitor Crs' is formed between the conductive layer 400 and the electrode 406. A capacitor Cfs' is formed between the conductive layer 400 and the electrode 404. A capacitor Ctf' is formed between the electrode 402 and the electrode 404. A capacitor Cfr' is formed between the electrode 406 and the electrode 404. A capacitor Cf" is formed between the electrode 404 and the fingerprint 420.

Figure 4B:
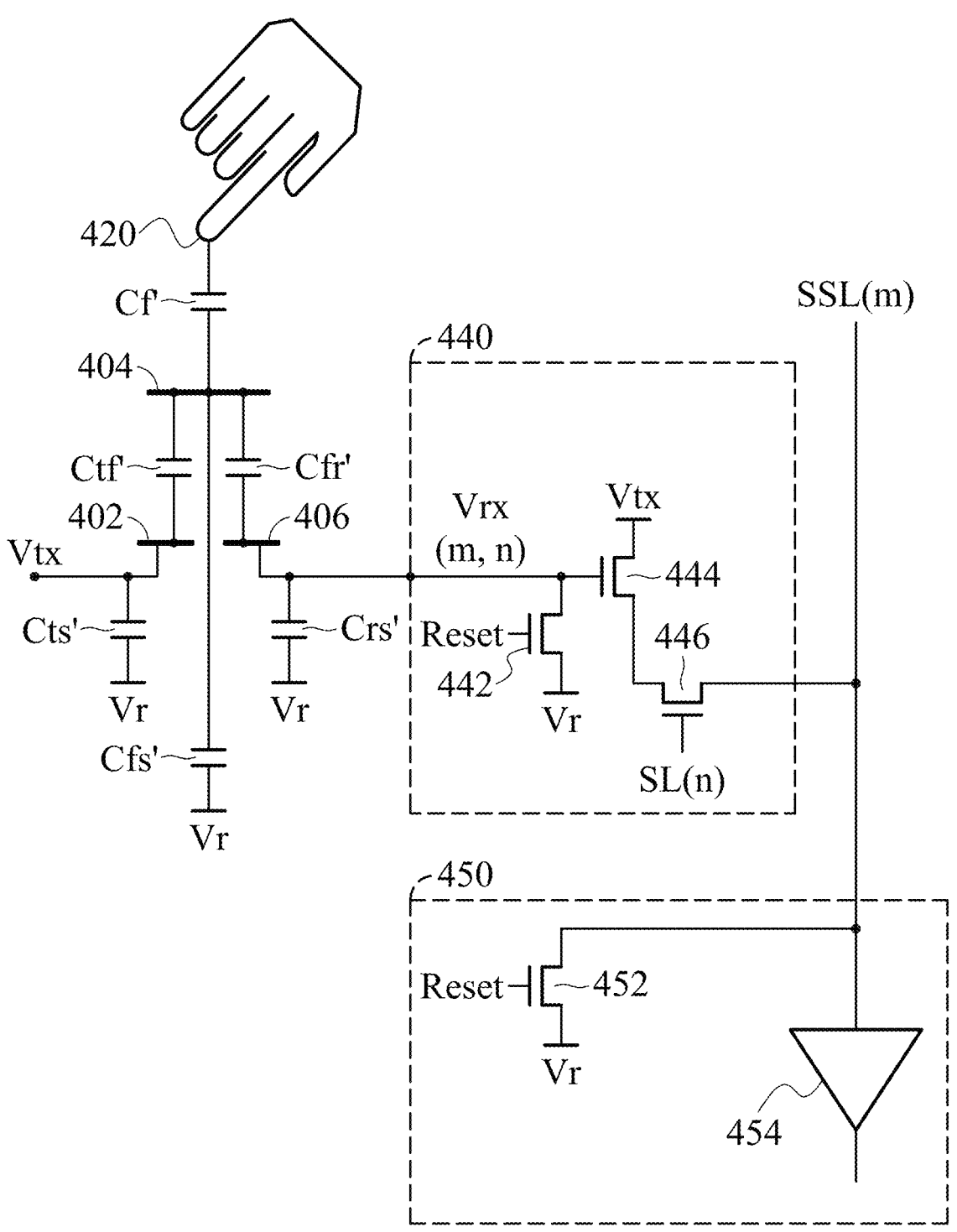
FIG. 4B is an equivalent circuit of the capacitive sensor in FIG. 4A in accordance with some embodiments of the disclosure.

FIG. 4B is an equivalent circuit of the capacitive sensor in FIG. 4A in accordance with some embodiments of the disclosure. As shown in FIG. 4B, a sensing signal Vtx, which is a clock signal, is provided on the electrode 402. The capacitor Cts' is disposed between the voltage Vr (that is, the conductive layer 400) and the electrode 402. The capacitor Ctf' is disposed between the electrode 402 and the electrode 404. The capacitor Cfr' is disposed between the electrode 404 and the electrode 406. The capacitor Cfs' is disposed between the voltage Vr and the electrode 404. The capacitor Crs' is disposed between the voltage Vr and the electrode 406. The capacitor Cf' is disposed between the electrode 404 and the fingerprint 420.

In some embodiments, the electrode 402 can be seen as a transmitter (Tx) of the capacitive sensor (m, n) in FIG. 4A, because the sensing signal Vtx is transmitted from the electrode 402. The electrode 406 can be seen as a receiver (Rx) of the capacitive sensor (m,n) in FIG. 4A, because an output voltage Vrx(m, n) can be received from the electrode 406.

In some embodiments, the capacitor Cts' may be 7.76 fF, the capacitor Ctf' may be 150.52 fF, and the capacitor Cfr' may be 141.66 fF. The capacitor Crs' may be 3.45 fF. The capacitor Cfs' may be 10.01 fF, but they are not limited thereto. The capacitor Cf' between the electrode 404 and the ridge of the fingerprint 420 may be 430.30 fF. However, the capacitor Cf' between the electrode 404 and the valley of the fingerprint 420 may be 0.18 fF. Since the output voltage is inversely proportional to the capacitance between the electrode 404 and the fingerprint 420, the output voltage Vrx(m, n) corresponding to the ridge of the fingerprint 420 may be less than that corresponding to the valley of the fingerprint 420.

For example, when the sensing signal Vtx with amplitude of 15V is applied to the electrode 402, the output voltage Vrx(m, n) may be 3.71V corresponding to the ridge of the fingerprint 420 with depth of 0 μm (assuming that the ridge of the fingerprint 420 is directly contacted with the insulating layer 434), and the output voltage Vrx(m, n) may be 13.43V corresponding to the valley of the fingerprint 420 with depth of 100 μm (assuming that the depth of the valley of the fingerprint 420 is 100 μm).

As shown in FIG. 4B, the capacitive senor (m, n) further includes a control circuit 440. The sensing line SSL(m) may be electrically connected to the electrode 406 through the control circuit 440. In some embodiments, the control circuit 440 includes a transistor 442, a transistor 444, and a transistor 446. The transistor 442 may have a first terminal received the voltage Vr, a second terminal electrically connected to the electrode 406, and a gate terminal received a reset signal Reset. The transistor 444 may have a first terminal received the sensing signal Vtx, a second terminal electrically connected to a first terminal of the transistor 446, and a gate terminal of the transistor 444 may be electrically connected to the electrode 406. The transistor 446 may have a second terminal electrically connected to the sensing line SSL(m), and a gate terminal of the transistor 446 may be electrically connected to the scan line SL(n).

Similarly, the reset signal Reset is pulled low and the sensing signal Vtx is pulled high during the sensing periods. During the sensing periods, when the sensing signal Vtx is pulled high, the voltage on the scan line SL(n) is also pulled high, the transistor 442 is turned off and the transistor 446 is turned on, the magnitude of the current passing through the transistor 444 and the transistor 446 can be determined according to the output voltage Vrx(m, n). In other words, the higher the output voltage Vrx(m, n) is, the larger magnitude of the current passing through the transistor 444 and the transistor 446 to the sensing line SSL(m). Therefore, a voltage corresponding to the ridge of the fingerprint 420 is present on the sensing line SSL(m) based on the current flowing through the transistor 444 and the transistor 446 during the sensing periods. Similarly, a voltage corresponding to the valley of the fingerprint 420 is also present on the sensing line SSL(m) based on the current flowing through the transistor 444 and the transistor 446 during the sensing periods. In some embodiments, before the sensing period, the reset signal Reset is pulled high and the sensing signal Vtx is pulled low in the reset period, then the output voltage Vrx(m, n) is initialized with the voltage Vr by the transistor 422.

In some embodiments, a voltage read-out circuit 450 receives the voltages corresponding to the ridge and/or the valley of the fingerprint 420 from the sensing line SSL(m), and converts the voltages into digital signals. The voltage read-out circuit 450 may include a transistor 452 and an analog-to-digital converter (ADC) 454. The transistor 452 may have a first terminal electrically connected to the sensing line SSL(m) and a second terminal received the voltage Vr. A gate terminal of the transistor 452 receives the reset signal Reset, and an input of the ADC 454 is electrically connected to the sensing line SSL(m). During the sensing periods, when the reset signal is pulled low, the transistor 452 is turned off, the voltages corresponding to the ridge and/or the valley of the fingerprint 420 from the sensing line SSL(m) is converted into digital signals by the ADC 454. In some embodiments, during the reset period before the sensing periods, the reset signal (Reset) is pulled high, the transistor 452 is turned on, then the sensing line SSL(m) is initialized with the voltage Vr by the transistor 452.

In some embodiments, the capacitive sensor (m, n) in FIG. 4A further includes a current read-out circuit (not shown) for replacing the voltage read-out circuit 450. The current read-out circuit includes a transistor, an op amplifier, an ADC, and a capacitor. The first input port of the op amplifier may be electrically connected to the sensing line SSL(m), the second input port of the op amplifier may receive the voltage Vr, and the output of the op amplifier may be electrically connected to the input of the ADC. The capacitor may be electrically connected between the sensing line SSL(m) and the output of the op amplifier. The transistor may be electrically connected between the sensing line SSL(m) and the output of the op amplifier. During the sensing periods, when the transistor is turned off, the currents corresponding to the ridge and/or the valley of the fingerprint 420 from the sensing line SSL(m) is converted into voltages by the capacitor and the op amplifier. The voltages will be converted into digital signals by the ADC. In some embodiments, the voltage read-out circuit 450 and the current read-out circuit may be disposed outside the capacitive sensor (m, n), for example, they are disposed in other function chip. In some embodiments, during the reset period before the sensing periods, the transistor is turned on, the capacitor is initialized, then the output of the op amplifier has the voltage Vr as an initial value.

In some embodiments, when the current read-out circuit is used to replace for the voltage read-out circuit 450, a p-type transistor can be used as the transistor 444 in the control circuit 440. When the voltage read-out circuit 440 is used, an n-type can be used as the transistor 444 in the control circuit 440.

In some embodiments, each of the control circuit 320 in FIG. 3B and the control circuit 440 in FIG. 4B may include one transistor (not shown), wherein the gate terminal of the transistor may be electrically connected to the scan line SL(n), a first terminal of the transistor may be electrically connected to the electrode 202 or the electrode 406, and a second terminal of the transistor may be electrically connected to the sensing line SSL(m). In some embodiments, the capacitive sensor (m, n) with the control circuit 320 in FIG. 3B or with the control circuit 440 in FIG. 4B can be called as an active pixel. The capacitive sensor (m, n) with the control circuit having one transistor can be called as a passive pixel.

Stray-capacitive (stray-cap) sensing is provided for the capacitive sensors in FIG. 1, FIG. 2, FIGS. 3A and 3B, and FIGS. 4A and 4B. Stray-cap sensing enables a large capacitance change which is the same as self-cap sensing and a simple read-out circuit which is the same as mutual-cap sensing. The simple sensor structure with the simple readout circuit enables large, flex and/or fast scan frames per second (FPS) with utilizing in-plane-switching liquid crystal (IPS-LC) array process and/or thinner system with no extra device such as light source for optical FPS.

The embodiments of the present disclosure are disclosed above, but they are not used to limit the scope of the present disclosure. A person skilled in the art can make some changes and retouches without departing from the spirit and scope of the embodiments of the present disclosure. Therefore, the scope of protection in the present disclosure shall be deemed as defined by the scope of the attached claims.

What is claimed is:

1. An electrode structure, comprising:
a first electrode having an opening;
a first insulating layer, disposed on the first electrode;
a second electrode, disposed on the first insulating layer;
a third electrode, disposed on the first insulating layer and surrounding the second electrode; and
a conductive layer disposed under the first electrode,
wherein the second electrode and the third electrode are in the same layer and an area of the conductive layer is greater than an area of the second electrode.

2. The electrode structure as claimed in claim 1, wherein a size of the second electrode is larger than a size of the opening.

3. The electrode structure as claimed in claim 1, wherein the first insulating layer comprises an organic material.

4. The electrode structure as claimed in claim 3, further comprising a second insulating layer disposed on the second electrode.

5. The electrode structure as claimed in claim 4, wherein the second insulating layer comprises an organic material.

6. The electrode structure as claimed in claim 1, wherein the first insulating layer comprises an inorganic material.

7. The electrode structure as claimed in claim 6, further comprising a second insulating layer disposed on the second electrode.

8. The electrode structure as claimed in claim 7, wherein the second insulating layer comprises an organic material.

9. The electrode structure as claimed in claim 1, wherein the third electrode has an opening and the second electrode is disposed in the opening of the third electrode.

10. The electrode structure as claimed in claim 9, wherein the opening of the third electrode is different from the opening of the first electrode in area.

* * * * *